March 26, 1935.  R. J. GITS  1,995,538
LAWN MOWER LUBRICATOR
Filed Nov. 22, 1933
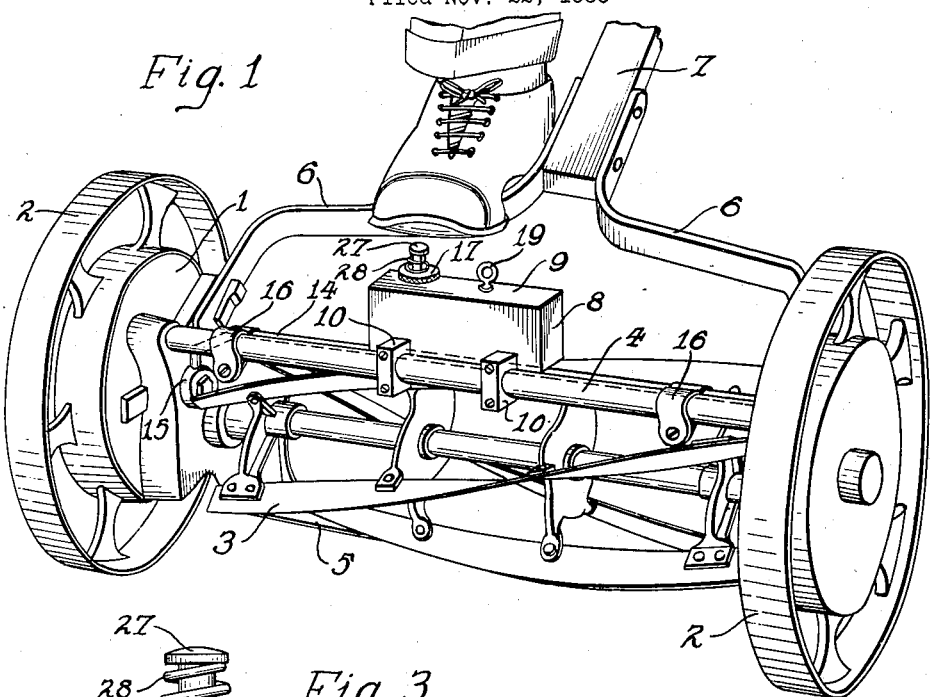
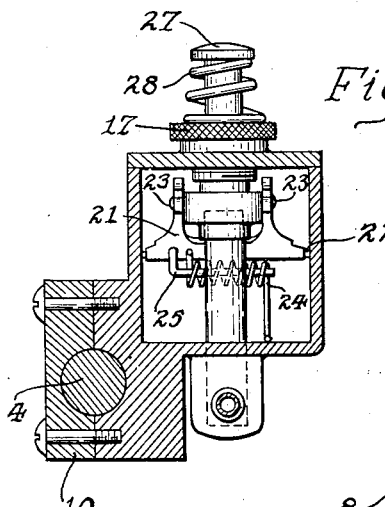
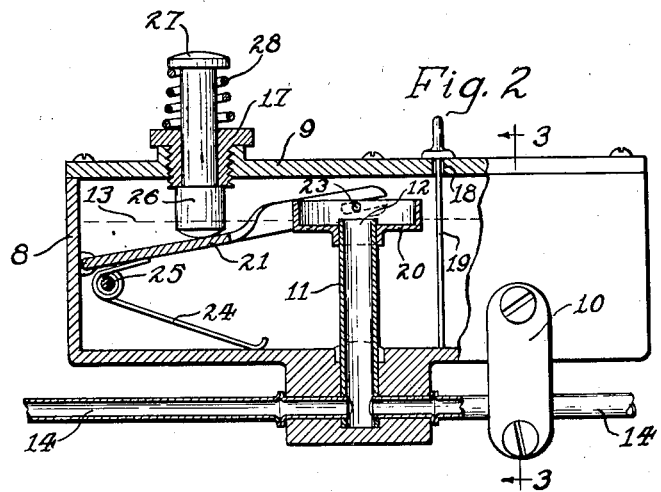
Witnesses:
Adolph T. Berg
W. A. Snow
Inventor
Remi J. Gits
By Rummler, Rummler & Woodworth
attys.

Patented Mar. 26, 1935

1,995,538

UNITED STATES PATENT OFFICE 1,995,538

LAWN MOWER LUBRICATOR

Remi J. Gits, Chicago, Ill.

Application November 22, 1933, Serial No. 699,143

2 Claims. (Cl. 184—6)

The main objects of this invention are to provide an improved form and arrangement of lubricating devices which simplify the work of lubricating a lawn mower, and to provide an improved form of unitary oiling system that can be initially incorporated into the structure of a lawn mower or similar machine by the manufacturer thereof, or can be readily adapted for sale as an accessory for attachment to lawn mowers and the like; and to provide a simple and approved form of lubricator especially adapted for such use, and designed for durability and simple operation.

A specific embodiment of this invention is illustrated in the accompanying drawing in which—

Figure 1 is a perspective view of a lawn mower equipped with lubricating mechanism in accordance with this invention:

Fig. 2 is an enlarged front elevation partly in section of the lubricator.

Fig. 3 is a sectional detail taken on the line 3—3 of Fig. 2.

The specific structure illustrated in the drawing is designed for use as an accessory applicable to any usual form of hand operated lawn mower, and is intended particularly for convenient operation while the lawn mower is in use, so as to relieve the operator of the annoyance and attention incident to the prevailing method of lubricating lawn mowers by means of the usual type of oiler can with tapered spout.

Lawn mowers, by reason of their very nature, usually require frequent oiling during the course of the work of mowing a lawn, and it is impractical for the operator to carry an oiler with him, so that he is usually required to stop his operation and go to some distant place for the oiler, and then attempt to inject the oil in the various bearings which are usually clogged with dirt.

The present invention is intended to obviate this trouble and merely require that the operator stop his progress for an instant, long enough to press his foot upon a pedal. The loss of time is negligible, and the proper oiling of every bearing is assured without further attention.

The usual hand-operated lawn mower comprises a pair of side frames 1, which carry the traction wheels 2 and house the mechanism that operates the rotating knives 3. These side frames are rigidly connected together by a cross bar 4, the fixed blade 5 and the yoke arms 6, that carry the handle 7.

In the form shown the unitary oiler comprises an oil reservoir 8, closed at the top by a lid 9, and fastened by means of clamp brackets 10 to the cross bar 4. Within the reservoir is a vertically disposed standpipe 11, which extends upwardly through the bottom of the reservoir and terminates in an inlet opening 12 located above or near the normal level of liquid in the reservoir indicated by the doted line 13. The standpipe 11 is connected at its botom end with oil ducts 14 which extend along the cross bar 4, and their extremities are fitted into the main bearings 15 of the side frame. These side frames, as is obvious, may be provided with internal oil passages connecting these main bearings with each of the places requiring lubrication, which are herein referred to as lubrication points, or the tubes 14 may be branched at their extremities with separate leads running to each lubrication point, as may be determined by the particular mower to which the system is to be applied. The oil ducts 14 are further supported by clamps 16.

The lid 9 of the oil reservoir is provided with a filler cap 17 and an aperture 18. An oil gauge 19, preferably in the form of a simple graduated test rod, extends through the aperture 18 and enables the operator to gauge the amount of oil on hand from time to time and to determine the filling level.

A measuring cup 20 slidably mounted on the standpipe 11 serves as a carrier for oil and is suitably proportioned so that at one charge it will deliver sufficient oil to the standpipe to take care of all the bearings served by the ducts 14.

The carrier is moved up and down on the standpipe 11 by means of a forked lever 21 fulcrumed at 22 on horizontal pivots near one end of the reservoir and the forked arm has slots at its ends that embrace studs 23 projecting from diametrically opposite points of the rim of cup 20.

A helical spring 24 is mounted on a rod 25 fastened to the lever 21 and normally urges the lever and cup 20 to the upper limit of their stroke.

The cup or carrier 20 is arranged so that when it is in its normal uppermost position at the top of the standpipe 11, its sides will extend above the inlet 12, and serve as a shield against splashing of oil into the inlet, due to agitation of the oil when the lubricating device is in normal use on a lawn mower. Thus although the device might be considerably shaken in use, there will be no waste of oil into the standpipe and oil will be passed only when desired by the operator.

The lever 21 and cup 20 are depressed for filling the cup by means of a plunger 26 which is slidably mounted in the filler cap and has a head 27, which serves as a pedal. A coiled spring 28 urges the plunger 26 to its upper position. As will be seen from Fig. 1, the pedal 27 is located near one end of the reservoir so as to be convenient for being depressed when the operator moves his toe downward while resting his foot on the cross bar 6, as illustrated in Fig. 1.

In operation the operator pushes down on the pedal 27 which coacting with the lever 21 lowers the cup 20 to the bottom of the reservoir. Upon release of the pedal the springs restore the parts to the position shown in Fig. 2, and the measured quantity of oil which is carried by the cup 20 then flows into the standpipe and is divided between the ducts 14 and carried to its destination in the bearings.

This operation is repeated whenever the operator desires to oil the bearings, and he soon learns from experience how frequently this may be necessary in the course of the operation of cutting the lawn.

Although but one specific embodiment of this invention is herein shown and described, it will be understood that numerous details of the construction shown may be altered or omitted without departing from the spirit of this invention, as defined by the following claims.

I claim:

1. A device of the class described comprising a reservoir for lubricant, an oil duct having an inlet located within said reservoir above the normal level of the lubricant therein, an oil carrier movable up and down for delivering lubricant to said duct inlet, a cover for said reservoir, a plunger slidably mounted in said cover having a pedal at its upper end, means disposed within said reservoir and connecting said plunger with said oil carrier for operating the latter, and a spring normally holding said carrier in its uppermost position, said carrier being arranged to shield said inlet against splashing of oil thereinto.

2. A device of the class described comprising a reservoir for lubricant, an oil duct extending upwardly into said reservoir and having an inlet located above the normal level of the lubricant therein, an oil carrier surrounding said duct and movable up and down thereupon for delivering lubricant to said duct inlet, a cover for said reservoir, a plunger slidably mounted in said cover having a pedal at its upper end, a lever positioned within said reservoir and connected for raising and lowering said carrier through engagement with said plunger, and spring means normally urging said carrier and plunger upward, said carrier being arranged to extend above and shield said duct inlet when in its uppermost position.

REMI J. GITS.